UNITED STATES PATENT OFFICE.

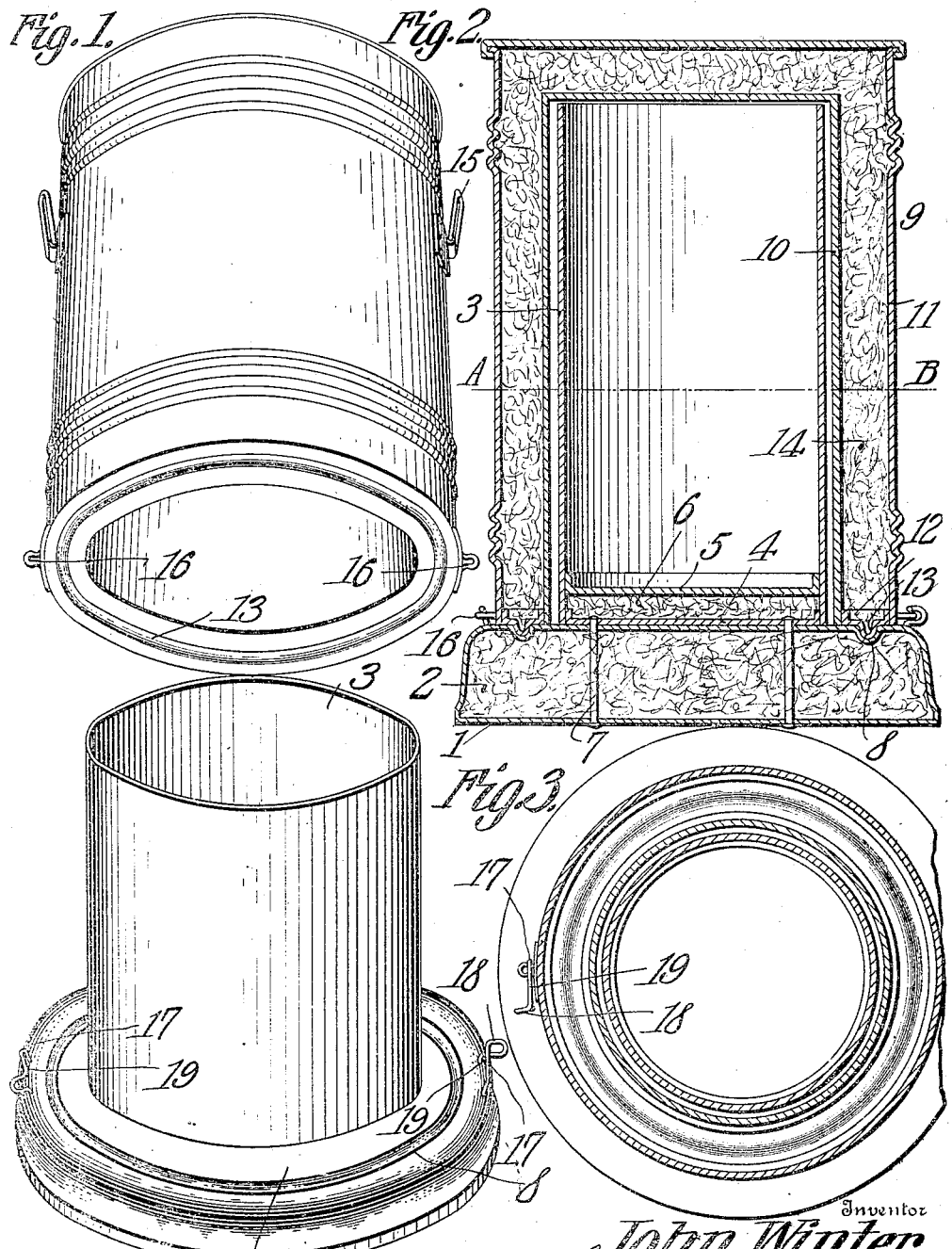

JOHN WINTER, OF GOSHEN, INDIANA.

FIRELESS COOKER.

955,733.   Specification of Letters Patent.   Patented Apr. 19, 1910.

Application filed September 4, 1909. Serial No. 516,193.

*To all whom it may concern:*

Be it known that I, JOHN WINTER, a citizen of the United States, residing at Goshen, in the county of Elkhart and State of Indiana, have invented a new and useful Fireless Cooker, of which the following is a specification.

This invention relates to devices of that type commonly known as fireless cookers and its object is to provide a durable and compact device of this character, the parts of which can be easily kept clean and which does not include in its construction any wood, cloth, pads or other absorbent parts which tend to render a device of this character unsanitary after same has been used for some time.

Another object is to provide a cooker which can be opened during the cooking process without much loss of heat, the construction of the cooker being such as to retain the heat as long as the device is in upright position.

Another object is to provide a seal for preventing the circulation of air between the cover and the base of the receptacle, said cover being in the form of a jacket designed to extend over and downward around the utensil-receiving portion of the cooker.

With these and other objects in view, the invention consists in certain novel details of construction and the combinations of parts hereinafter more fully described and pointed out in the claims.

In the accompanying drawings the preferred form of the invention has been shown.

In said drawings:—Figure 1 is a perspective view of the complete cooker, the cover or jacket being shown elevated above the receptacle. Fig. 2 is a central vertical section through the cooker and showing the jacket in position on the base. Fig. 3 is a section on line A—B, Fig. 2, a portion of the base being broken away. Fig. 4 is a detail view of the fastening means employed for securing the jacket upon the base.

Referring to the figures by characters of reference, 1 designates a base, preferably formed of zinc, having a filling 2 of heat insulating material, there being a tubular receptacle 3 arranged concentrically upon the base and provided with a bottom 4 and an inner or false bottom 5, between which is arranged heat insulating material such as indicated at 6. The bottom 4 is connected to the base in any preferred manner, as by means of fasteners 7 extending through the base. A circular channel 8 is formed in the top of the base and concentric with receptacle 3. The receptacle is provided with a jacket 9 made up of an inner tubular member 10 and an outer tubular member 11, said members being spaced apart and concentric with each other, there being a spacing ring 12 between the lower ends of the two members and provided with a circular rib 13 designed to be seated within the groove or channel 8. Both of the members 10 and 11 are closed at their upper ends, said ends being spaced apart and the space between the two members being completely filled with a suitable heat-insulating material, such as indicated at 14. The external diameter of the receptacle 3 is less than the internal diameter of the inner member 10 of the jacket so that when the jacket is in position over and around the receptacle, an air space is formed between the jacket and receptacle, this air space communicating with the interior of said receptacle at the upper end thereof. This is permissible in view of the fact that said receptacle does not contact with the closed end of the inner member 10.

Handles 15 of any suitable construction are preferably connected to the outer member 11 of the jacket 9 and constitute means whereby said jacket can be conveniently removed from the receptacle.

It is to be understood that the receptacle and the jacket can be of any preferred cross sectional contour.

Any suitable fastening means may be employed for securing the jacket 9 upon the base. When the jacket and receptacle are cylindrical, the fastening means disclosed in the drawings are preferably utilized. This fastening means includes oppositely extending ears 16 arranged upon the lower portion of the jacket and extending laterally therefrom, said ears being designed to move into engagement with a keeper 17 mounted on the base 1. Each keeper is formed of a U-shaped portion 18 disposed in a vertical plane and sufficiently long to permit one of the ears 16 to move therethrough. One arm of the U-shaped portion is secured to the base while the other arm merges into a laterally extending retaining finger 19, one end of which is attached to the base in any suitable manner. Each finger is so located that when ears 16 are shifted through the U-shaped portions of the keepers, they will assume positions beneath the fingers and thus be held against upward movement relative to the base. When the fastening devices are thus in engagement, the jacket 9 is held firmly on the base and with the rib 13 seated within the groove or channel 8.

In using the device herein described the utensil containing the food to be kept hot or cold is placed within the receptacle 3 and the jacket 9 is then placed on the receptacle so as to seat the rib 13 in groove or channel 8. Said jacket is then partly rotated to bring the ears 16 into engagement with the finger 19 of the keepers. The jacket and base are thus locked together and the heat is retained by the insulating material contained within the jacket, within the base, and within the bottom portion of the receptacle. Any moisture condensing upon the inner member 10 of the jacket will flow downward into the air space between the member 10 and the receptacle and will tend to seal the joint between the jacket and the base and thus positively prevent the passage of air between the parts. When it is desired to inspect the contents of the receptacle, the jacket is turned so as to become unlocked and is then lifted a sufficient distance above the receptacle to render the contents visible. The elevated jacket will remain filled with hot or cold gases and when it is returned to closed position these gases will displace any air which may have entered the receptacle during the temporary opening thereof. The temperature within the body will not, therefore, vary to an objectionable extent as a result of such inspection.

It will be noted that there are no parts of the device which will absorb moisture and therefore the cooker will not become foul after being used for some time. The various parts can be quickly cleaned in the same manner as an ordinary metal utensil and are, therefore, perfectly sanitary.

Although the base 1 has been shown and described as containing an insulating material, it is to be understood that, if preferred, the same may be formed entirely of metal or any other material desired.

It is to be understood that various changes may be made in the construction and arrangement of the parts without departing from the spirit or sacrificing the advantages of the invention.

What is claimed is:—

1. A fireless cooker including a base, an upstanding tubular receptacle receiving portion fixed upon the base, an annular sealing groove within the base and concentric with said upstanding portion, a tubular cover closed at the top and extending over and around the fixed upstanding portion and spaced therefrom, the lower end of the cover bearing on the base and bridging the groove, and an outstanding annular projection upon the bottom of the cover and removably seated within the groove, the annular space between the cover and the upstanding receptacle receiving portion being adapted to receive and hold condensed moisture to seal the cooker against the admission of air between the base and cover.

2. A fireless cooker including a base, an upstanding tubular receptacle receiving portion fixed relative to the base, and a cover removably mounted on the base and extending around and over said upstanding portion and spaced therefrom.

3. A fireless cooker including a base, a tubular upstanding receptacle receiving portion fixed relative to the base, a cover resting upon the base and extending over and around said upstanding portion to prevent the admission of air thereto, and coöperating means upon the base and cover for holding said cover spaced at all points from the upstanding portion.

In testimony that I claim the foregoing as my own, I have hereto affixed my signature in the presence of two witnesses.

JOHN WINTER.

Witnesses:
E. E. MUMMERT,
DIANA M. PUTNAM.